(12) United States Patent
Haake et al.

(10) Patent No.: US 11,923,158 B2
(45) Date of Patent: Mar. 5, 2024

(54) SAFETY SWITCH ASSEMBLY WITH CLAMPING ELEMENT

(71) Applicants: André Haake, Stadtlohn (DE); Oliver Haake, Stadtlohn (DE); Patrick Haake, Vreden (DE); Jonas Haake, Stadtlohn (DE)

(72) Inventors: André Haake, Stadtlohn (DE); Oliver Haake, Stadtlohn (DE); Patrick Haake, Vreden (DE); Jonas Haake, Stadtlohn (DE)

( * ) Notice: Subject to any disclaimer, the term of this patent is extended or adjusted under 35 U.S.C. 154(b) by 0 days.

(21) Appl. No.: 17/395,540

(22) Filed: Aug. 6, 2021

(65) Prior Publication Data

US 2021/0366667 A1 Nov. 25, 2021

Related U.S. Application Data

(63) Continuation of application No. PCT/EP2020/051887, filed on Jan. 27, 2020.

(30) Foreign Application Priority Data

Feb. 8, 2019 (DE) .......................... 102019103103.6

(51) Int. Cl.
*H01H 3/02* (2006.01)
*B60T 7/22* (2006.01)
*B66F 17/00* (2006.01)
*H01H 9/02* (2006.01)

(52) U.S. Cl.
CPC ............... *H01H 3/022* (2013.01); *B60T 7/22* (2013.01); *B66F 17/003* (2013.01); *H01H 9/02* (2013.01); *B60T 2201/022* (2013.01)

(58) Field of Classification Search
CPC .. H01H 3/022; H01H 9/02; B60T 7/22; B60T 7/12; B66F 17/003; B60P 1/44; B60R 19/56
USPC ........ 200/334; 414/556, 557, 558, 545, 539, 414/540, 541
See application file for complete search history.

(56) References Cited

U.S. PATENT DOCUMENTS

| 5,653,568 A * | 8/1997 | Josephs ..................... B60P 1/44 414/545 |
| 5,999,072 A * | 12/1999 | Slavik ................ H01H 36/0006 335/207 |
| 2016/0365200 A1* | 12/2016 | Haake ....................... B60T 7/22 |

FOREIGN PATENT DOCUMENTS

| DE | 3824637 | * | 1/1990 | ............. B60R 19/56 |
| DE | 3824637 A1 | | 1/1990 | |
| DE | 4339688 A1 | | 5/1995 | |

* cited by examiner

*Primary Examiner* — Edwin A. Leon
*Assistant Examiner* — Iman Malakooti

(57) ABSTRACT

A safety switch assembly for use on a movable device. The assembly includes a bracket, an impact surface that is held in position in the bracket, and a switch. The bracket and impact surface are clamped against the movable device. The impact surface is an easily replaceable component.

22 Claims, 3 Drawing Sheets

SAFETY SWITCH ASSEMBLY WITH CLAMPING ELEMENT

BACKGROUND INFORMATION

Field of the Invention

The invention relates to a safety switch on movable devices or vehicles, to prevent collisions of such devices with obstacles and persons. More particularly, the invention relates to a safety switch assembly to be mounted on industrial trucks.

Discussion of the Prior Art

The movable devices referenced herein include industrial trucks, such as forklift trucks, non-powered and powered forklifts, including so-called walk-along forklifts. The safety switch assembly may be constructed as an apron or panel that is attached to the body of the device and/or may also be mounted on the prongs of the fork.

Unlike a forklift truck that has a driver's seat for the operator, the operator walks behind or next to a non-powered forklift truck or the walk-along industrial truck. With battery-powered walk-along industrial trucks, the operator is in the immediate vicinity of the movable device and is actually in physical contact with it when operating the controls on the handle or steering the movable device by means of the steering shaft that controls the wheels. Therefore, the protection of the operator's feet is of paramount importance and, to this end, the safety switch is typically provided on the sections of the movable device that face the operator and that may also enclose, for example, the drive unit of the movable device. In such devices, too, the safety switch may be mounted on other areas of the body or a housing of the device and/or on the prongs of the fork, as a means to prevent collisions.

The conventional safety switch assembly includes a switch and an impact surface mounted on the movable device. In the event of an approaching collision, the impact surface is makes contact with the switch, thereby triggering a switching operation that influences operation of the movable device in a way that avoids the pending collision. Different constructions of such movable devices require impact surfaces that are adapted to the specific construction, among other things, the specific dimensions and contours of the device, i.e., the specific forklift model at issue.

DE 20 2014 001 722 U1 discloses safety switch that is mounted on a movable device as an additional safety measure. The impact surface is a rigid or stiff component and has a shape the corresponds to the specific geometry of the movable device on which it is to be mounted. Such safety switch assemblies are affixed to the movable devices by means of a bracket which holds the impact surface in position. The bracket disclosed has an elastically deformable profile which, due to its deformability, is readily adaptable to different contours of movable devices. If, in the event of a collision of the movable device with a wall, the support column of a building or a shelf system, a loaded pallet, or similarly stationary obstacles, it is possible that the bracket is so severely damaged that it must be replaced. Replacing the impact surface is a relatively simple procedure. Replacing the bracket, on the other hand, is usually a significantly more complex process and requires significantly more time. The conventional bracket is connected to the movable device at several points in a punctiform manner, for example, is bolted or screwed to the movable device. It requires time to manipulate a plurality of such fasteners. It is also often the case that in collisions with an obstacle, the deformable material of the bracket between two fastening points is compressed and deformed to such an extent that the area of the bracket between two fastening points is damaged, or that it is torn from a fastening point.

German Patent Document DE 43 39 688 A1 discloses a needle contact element of a safety contact rail. This is referred to as a switch in the above-mentioned DE 20 201 4 001 722 U1. The safety contact rail is constructed as a hollow rubber profile that has electrically conductive and non-conductive areas in its cross-section. When the hollow rubber profile is sufficiently deformed, electrically conductive areas come into contact with one another and trigger a switching pulse. A channel extends through an electrically conductive area of the hollow rubber profile. The needle contact elements can be inserted into these channels where they are accessible at the end of the hollow rubber profile, such that the contact elements partially protrude from the hollow rubber profile and transmit the switching pulse to an evaluation device. The hollow rubber profile also has a T-shaped section, referred to as a carrier, which can be inserted and held in a corresponding recess or groove, for example, on a roll-up door. An additional channel extends through the carrier into which a reinforcing or bracket wire can be drawn or inserted as needed.

What is needed, therefore, is a safety switch assembly that is readily adaptable to the various models of movable devices. What is further needed is such a safety switch assembly that allows the impact surface to be easily and quickly replaced.

BRIEF SUMMARY OF THE INVENTION

It is an object of the invention to provide a safety switch assembly that is sufficiently adaptable to different vehicle body contours, such that the assembly is securely mountable on various models of industrial trucks and similar movable vehicles or devices. The safety switch assembly according to the invention includes a switch, an impact surface, a bracket for holding the impact surface in position, and a clamping element that holds the impact surface in the bracket and holds the bracket against the movable device, whereby separate clamping elements may be provided for the bracket and the impact surface, or, alternatively, a single clamping element may serve to clamp both the bracket and the impact surface in position on the movable device.

The intended use of the safety switch assembly is on an industrial truck, i.e., a forklift, both powered and non-powered, and particularly walk-along forklifts, and the term 'movable device is used hereinafter as an overarching term for such types of vehicles and equipment; it is understood, however, that this safety switch assembly may be used on other types of devices, vehicles, and equipment.

The safety switch assembly is based on the consideration that the area of the housing of the movable device where the safety switch assembly is to be mounted typically has a convexly curved contour. In many cases, the sides of the housing are flat, but, in everyday operation, these areas rarely suffer a collision. The area of the movable device that poses the greatest danger to the operator is the rear face, i.e., the part of the movable device that faces away from the fork and faces toward the operator. This rear area is where the drive unit and the battery of the industrial truck are enclosed in a housing. A steering shaft that terminates in a handle on which the device controls are mounted is also located at this end of the movable device. This is where the operator typically is when operating the movable device, which means that there is the danger that the operator's feet get under the housing. For example, particularly when operating the movable device in tight spaces and in reverse, there is a danger that the movable device bump into or run over the operator's foot. Thus, it is of particular importance that the safety switch be provided in this area.

The specific configuration of the movable device is determined by three criteria: first, the shape of its housing or body panels; second, the height where the bracket of the safety switch is to be positioned; and third, the ground clearance, i.e., how far above the floor or underlying surface the impact surface is to terminate. The safety switch assembly according to the invention provides an assembly that is adaptable to these three criteria.

Various types of switches are suitable for use in the safety switch assembly according to the invention. When a tactile switch is used, the impact surface is mounted such that it is movable between a first position, i.e., a rest position, and a second position, i.e., an actuating position, in which it actuates the switch, thereby triggering a switching operation. The ability of the impact surface to move between these two positions may be achieved in a couple of ways. First, the impact surface itself may be elastically deformable, so that, when pressure is exerted on the impact surface, it deforms and makes contact with the switch. Alternatively, or in addition to the elastic deformability of the impact surface, the impact surface may be mounted in a way that allows the impact surface to move, for example, have a hinge-like component that allows at least a section of the impact surface to move into the actuation position. The impact surface is preferably constructed with sufficient rigidity to ensure that, even when pressure is exerted at a spot on the impact surface which is offset to the switch, i.e., the place where the pressure is applied is not directly aligned with the location of the switch, adjacent areas of the impact surface are also movable into the actuating position, so as to trigger the switching operation.

The clamping element extends horizontally and exerts a uniform clamping force along its entire length, and thus, against the bracket and/or on the impact plate, depending on its use. With regard to the bracket, this uniform pressure prevents the bracket from being compressed and torn from an attachment means, for example, a screw, in the event of an oblique collision with an obstacle. The uniform pressure also means that bracket is able to accommodate tolerances in the specific contour. With regard to the impact surface, the uniform contact pressure means that the impact surface is evenly pressed against the contour of the movable device, to achieve optimal conformity between the contour of the movable device and the impact surface that is clamped against it in this manner.

If the impact surface were to be constructed from a rigid material, then it would be necessary to produce many different configurations of the impact surface, in order provide a functionally reliable impact surface for the many different models of movable devices that exist, i.e., to produce impact surfaces that accommodate the specific dimensions and contours of the various models of such movable devices. This, of course, increases the cost of production of the impact surface. Tolerances with respect to the shape of the contour would also adversely affect the secure mounting of such rigidly formed impact surfaces. Thus, it is advantageous to provide an impact surface that is not completely rigid and that is not specifically shaped to accommodate a specific geometry of the movable device. Rather, it is much more economical to use a material for the impact surface that has sufficient rigidity to function as a switch actuator, but has sufficient deformability to accommodate the typical contours on the movable device.

The impact surface in the safety switch assembly according to the invention is made of a material that is referred to hereinafter as 'semi-hard.' The semi-hard impact surface is considered rigid, in that it is not made of a flexible material that deforms only at the point where pressure is applied, such as is the case, for example, with film, fabric, or similar materials. When applying pressure to a point on the semi-hard impact surface that is not directly aligned with the switch, i.e., is offset from the switch, the semi-hard impact surface has sufficient rigidity that adjacent regions of the impact surface also deflect or deform under the pressure and are thus moved into a position that actuates the pressure-sensitive tactile switch and triggers a switching operation. In other words, the contact with the semi-hard impact surface therefore does not have to take place precisely at a location that is aligned with location of the tactile switch. As such, the impact surface behaves like a rigid, i.e., hard element.

Tactile switches are not the only type of switches that are suitable for use in the safety switch assembly according to the invention. Non-contact switches are also suitable, for example, capacitive proximity switches. In this case, the impact surface serves as a protective shield to protect the switch against mechanical and other influences. The purpose of using a semi-hard material for the impact surface is not to actuate the switch, but to provide sufficient dimensional stability to the impact surface to increase its protective function and prevent any deformations in the material that might create undesired gaps and reduce the effectivity of the protective shield.

As previously mentioned, the impact surface according to the invention has to be adaptable to the different contours on the different models of movable devices. The semi-hard impact surface not only has the desired rigidity to actuate the switch, but it is also sufficiently flexible, so that it is adaptable to a curve over a length of a few decimeters and is even able to be curved into a U-shape. Thus, the semi-hard impact surface is suitable for use on surfaces that are flat, as well as on curved surfaces, such as the housings or other areas of the movable device that require safety devices. Due to its flexibility, the semi-hard impact surface is generally able to be fitted to the different surface geometries of movable devices without any problem and this flexibility enables the use of the standardized impact surface according to the invention on different types or models of movable devices.

The material for the impact surfaces may initially be in the form of a strip material and may have a specific cross-sectional geometry. For example, a section of the strip material may have small protrusions or nubs that serve as actuators for tactile switches, or may have a deformation section, which will be explained in more detail below. The strip material is a semi-finished product from which the impact plate is then cut to size to accommodate the specific criteria. Thus, producing an impact plate or surface from this strip material, one that is able to accommodate the three criteria mentioned above, is a particularly economical undertaking, compared to producing a three-dimensionally shaped impact plate that is designed to fit to a specific contour of a movable device. The economic advantage relates both to the initial installation of the safety switch assembly, as well as to supplying impact surfaces as replacement parts.

The impact surfaces may be cut from a two-dimensional, flat strip or sheet of the desired semi-hard material, in other words, the impact surface may be cut from standardized, commercially available sheets of semi-hard material. Thus, the impact surfaces according to the invention may be easily and quickly produced. This is not only economical as far as production goes, but also allows replacement parts to be supplied on short notice, without having to maintain a large inventory. Compared to the above-mentioned strip material that has a special profile with its switch nubs, this smooth material with a constant material thickness is particularly economical. In order to use an impact surface made of this flat material with a tactile switch that is provided as a switch strip or switch mat, separate elements may be provided between the impact surface and the switch, instead of the switch nubs mentioned above, in order to ensure that sufficient force acts on the switch at a specific point, in order to trigger a switch operation. For example, round rods may be suspended from the bracket and extend between the switches and the impact surface.

Switch strips or switch mats are well suited for use in this safety switch assembly according to the invention, because such switches are comparatively easy to install on the movable device and are easily adaptable to the desired length, so as to provide the switch function along any desired length on the movable device. And being a single component, they also require only a single cable to connect to a controller. As an alternative to such tactile switches or in addition thereto, a plurality of separate switches may be connected to one another. Certain geometries, for example, contours with a tight radius of curvature, may make it difficult to mount a switch strip or switch mat on them, and in such cases it may be preferable to mount individual switches. For example, tactile switches may be mounted adjacent to one another without gaps between them, so as to provide an uninterrupted switch protection across the length of the safety switch assembly. Non-contact proximity switches, for example, capacitive switches, may be also be used. Because of their detection zone, such proximity switches may be spaced some distance apart from one another, yet still provide the desired uninterrupted switch protection across a long section of the movable device.

As mentioned above, the housings or body panels on movable devices typically have a rectilinear or convex circumferential contours, rather than concave contours. These flat or convex contours make it possible to mount the impact surface on the movable device by clamping the impact surface against the respective section of the movable device in a manner that causes sufficient deformation of the impact surface to accommodate the specific contour of the section. In this way, an initially two-dimensional sheet is deformed, for example, into a U-shaped curved contour, and adapted to the curved shape of the body panel of the industrial truck.

The clamping element is flexible and extends beyond the width of the impact surface, that is to say, extends around to the sides of the movable device. Various configurations of the clamping element are suitable to provide the desired clamping effect on the bracket and the impact surface, including an open loop, i.e., approximately C-shaped configuration, or a closed loop configuration. Due to its flexibility, the clamping element is readily adaptable to the outer contour of the movable device, which is either rectilinear or convex. The impact surface is also adaptable to this contour, and is clamped against the movable device. Releasing the clamping element thus also releases the impact surface, which is then readily removable from the safety switch assembly, should it need to be replaced.

Various means may be used to regulate the tension on the clamping element. The clamping element has sufficient tensile strength to absorb and transmit the tensioning forces, and is also sufficiently elastically or flexibly deformable to be able to adapt to the specific contour of the movable device. The clamping element may be connected to a tensioning device, such as, for example, a continuously adjustable clamping lock, an eccentric or toggle lever clamping closure that allows the clamping element to be selectively loosened or tightened.

The clamping element described herein serves two purposes: to clamp the mounting bracket against the movable device and/or to hold the impact surface in the proper position in the bracket. When the term 'clamping element' is used hereinafter, without an additional modifier, then the term refers generally to a clamping means and applies to both a bracket clamping element and an impact surface clamping element.

The impact surface clamping element is a cable that is threaded through a first clamping channel in the bracket. This clamping channel is provided within the bracket such that the impact surface is held between the clamping channel and the movable device. The impact surface clamping element exerts a clamping force on the impact surface, thereby pressing and holding the impact surface in a desired position relative to the movable device. This clamping action forces the semi-hard impact surface to deform, thereby forcing the surface to conform to the contour of the movable device. The fact that the impact surface is clamped in place means that, by loosening the clamping element, the impact surface is simply and quickly removable and replaceable with another one, should replacement be required.

The bracket may be similarly mounted on the movable device: in this case, the bracket clamping element extends through a second clamping channel that is provided in the bracket. Structurally, this second clamping channel may be the same as the first clamping channel. Its position, however, differs from that of the first clamping channel, because it serves to clamp the bracket against the movable device, rather than clamp the impact surface in place. In fact, the impact plate is located outside the area in which the bracket clamping element exerts a clamping force. Thus, it is possible to insert or remove the impact surface, without first having to loosen or release the bracket clamping element. And as with the impact surface, the bracket does not have to be specifically constructed to fit to a specific model of a movable device, instead, the bracket may be constructed as a profile strip that is sufficiently flexible to conform to the different circumferential contours of various models of movable devices.

It is also possible, however, that the clamping element is a continuous element that clamps both the bracket and the impact surface. In this case, the clamping element is a single cable that runs through both clamping channels, thereby clamping the impact plate in the bracket and also clamping the bracket against the movable device.

In another embodiment, the bracket itself is a clamping element and serves to hold the bracket on the movable device without an additional bracket clamping element. In this case, the two ends of the bracket are connected to a tensioning device, either to a common tensioning element or to separate tensioning elements, in order to build up tensile forces in the bracket and to press the bracket against the movable device. The fact that the second clamping channel described above is not required simplifies the construction of the bracket and also reduces the cross-section, i.e., the thickness of the bracket in the area where it is mounted to the movable device, thereby allowing for a particularly flat configuration of the safety switch assembly.

The impact surface may be secured in the bracket in different ways, for example, by a positive form fit. In such cases, the impact surface clamping element serves to hold the impact surface in its contoured shape and to secure it against undesired detachment from the bracket. It is, however, particularly advantageous if the impact surface is held in the bracket without such a form fit, and thus, does not require the necessary mating contours on the bracket and the impact surface to achieve the form fit. The bracket preferably has a groove for receiving the impact surface, so that the impact surface is simply inserted into this groove and is then held in position by the impact surface clamping element. The groove extends from a lower opening to a groove base lying above it, allowing the impact surface to be inserted into the groove from below. The impact surface clamping element is located some distance down from the base of the groove, so that the impact surface is securely clamped in the groove, even when it is not inserted all the way into the groove. This allows the height of the impact surface in the groove to be adjusted to obtain a desired ground clearance between the lower edge of the impact surface and the surface on which the movable device travels.

A tension cable may be used as the clamping element. The use of such cables is cost-effective, because they are made from a wide variety of materials, with different diameters and different load capacities, and are commercially available. Various clamping elements are also commercially available on the market, which are designed to connect to tension cables, for example, turnbuckles, shroud tensioners, and the like.

A tension strap may also be used as the clamping element. The strap has a wider cross-section than that of a cable, and thus, the clamping forces acting on the bracket and/or on the impact surface are distributed over a larger surface, thereby reducing the load on the components due to the reduced surface pressure. A metal strip may be used for the tension strap. A metal strip has the advantage that it is readily attachable to the respective clamping element, i.e., to a cable, for example, by soldering or welding. Yet another alternative is to use a strip of fiber-reinforced composite material for the tension strap. Such materials have very high tensile load capacity, low weight, and do not corrode.

In many cases, the housings or body panels on movable devices are curved downward and inward. A stop may be provided on the movable device to prevent the bracket from yielding to downward clamping forces and slipping downward on the movable device, as well as to generally prevent a dislocation of the bracket. The stop is fixed in place on the movable device, below the bracket, so that the lower edge of the bracket may be in contact with the stop. The stop may simply be a screw that is screwed from the outside into the housing or body panel of the movable device, or be a machine screw that is inserted through a bore and secured on the inside with a nut. In each case, the head of the screw serves as the stop.

In order to facilitate the movability of the impact surface between its resting position and its actuating position, the impact surface may have three different areas in the vertical direction: a bottom section, i.e., an actuating section, that is sufficiently rigid to ensure that the switch is actuated, even when pressure is applied to the impact surface at a point that is not directly aligned with the position of the switch; a top section, i.e., a bracket section, that is clamped in place in the bracket; and a middle section, i.e., a deformation section, that is provided between the bottom section and the top section and is constructed to be easily deformable or highly flexible, so as to allow the bottom section to move into the actuating position when pressure is applied to bottom section. The bracket section may be made of a relatively rigid material, for example, from the same material as the actuating section.

There are several ways to achieve the desired flexibility or deformation of the middle section. One way is to reduce the flexural rigidity of the material in that section. An economical way of achieving this is to cut the impact surface from a sheet material according to the specific geometry that is required for a specific movable device, and then to machine material away from the deformation section to obtain the desired flexibility or deformability. If the thickness of the material is to remain the same over all three sections, multiple bores may be introduced into the deformation section, so as to reduce the flexural rigidity of the material. Another method of increasing the flexibility in the deformation section is to mill out lines or ridges, etc., i.e., to reduce the thickness of the material in that section. Another way of achieving this geometric structural weakening is to provide the material in the deformation section with a wave-shaped cross-sectional profile, which effectively reduces the bending resistance of the material in that area. One advantage of these three methods of weakening the geometric structure of the material in the deformation section is that all three sections of the impact surface are made of the same material, i.e., a continuous sheet of material.

Alternatively, the deformation section can be formed by a strip of material which differs from the material of the actuating section and which, in contrast, has a lower bending stiffness, that is to say, represents a more flexible material.

Yet another alternative to achieving the deformation section is to provide a mechanical joint in the middle section. A hinge having a defined hinge axis is not particularly suitable, because of the curved contour that the impact surface may have to conform to. A chain, however, that connects the top and bottom sections of the impact surface provides the desired flexibility to the middle section of the impact surface. The chain may consist of just two or three links, i.e., be a very short chain. Providing a plurality of such chains to link the top and bottom sections of the impact surface also allows the impact surface to accommodate the different contours of various models of the movable devices.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
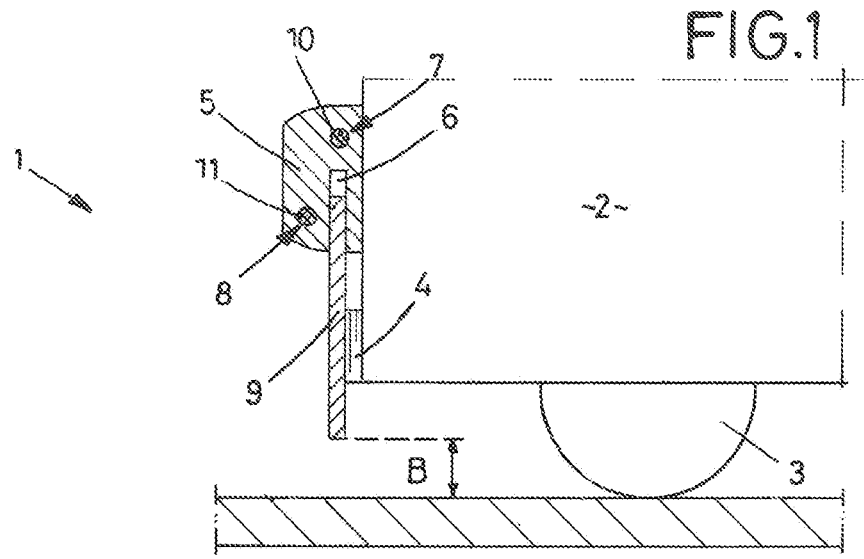
FIG. 1 is a vertical cross-section through the safety switch assembly according to the invention, which is shown mounted on an industrial truck.

FIG. 1 shows a vertical cross-section through a first embodiment of a safety switch assembly 1 according to the invention, which is mounted on some type of movable device 2. In this case, the movable device 2 is a motorized walk-along industrial truck that has running wheels 3. The movable device 2 has a housing which encloses an electric drive motor for the running wheels 3 and a rechargeable battery pack. Not shown in the drawing is a height-adjustable fork that is used to lift/lower pallets, and which extends from the front of the movable device 2, i.e., to the right of movable device 2 in FIG. 1.

Not shown in the drawing is steering shaft, which extends from the movable device 2 obliquely upwards and ends in a handle on which the controls to operate the movable device are located. The controls allow the operator to control travel motion of the movable device 2, as well as raise and lower the fork. The shaft is also used to steer the running wheels 3. The end of the movable device 2 that has the shaft and that faces the operator during normal operation of the movable device 2 is designated hereinafter as the back end or rear side of the movable device 2 and the end of the movable device having the fork designated as the front end.

The safety switch assembly 1 according to the invention comprises a switch 4, an impact surface 9, a mounting bracket 5, an impact surface clamping element 8 to hold the impact surface in the bracket 5, and a bracket clamping element 10 to hold the bracket 5 against the movable device 2. Various types of safety switches are known in practice, so it is not necessary to discuss the details of the switch 4 in detail herein. Suitable constructions of safety switches for use in the safety switch assembly 1 include switch strips or elongated, relatively narrow switch mats. Tactile switches as well as proximity switches are suitable for use in the safety switch assembly 1. If the switch 4 is a tactile switch, it reacts to pressure, such that it changes the switching state when a certain pressure is applied to it. If the switch 4 is a non-contact proximity switch, it has a detection zone that extends some distance from the switch itself, allowing the switch 4 to detect an obstacle before it comes into contact with the impact surface 9.

The switch 4 is connected to a safety circuit that evaluates a change in the switching state, which then triggers some response. For example, the safety circuit may send out an optical or acoustic warning signal or influence the travel motion of the movable device 2, for example, by reducing the travel speed or bringing the movable device to a complete stop.

The safety switch assembly 1 is typically installed on the back end of the industrial truck 2. In the embodiment shown, the mounting bracket 5 is a profile strip made of plastic. The bracket 5 has a downwardly opening groove 6, a bracket clamping channel 7, and a impact surface clamping channel 8. The impact surface 9 is inserted into the groove 6 and, in this embodiment, is held so as to be in contact against the switch 4. The impact surface 9 in this embodiment serves not only to transmit pressure resulting from a collision onto the switch 4, but also to protect the switch. In the event of a collision, the impact surface 9 may become damaged but protect the switch 4 from being damaged. The impact surface 9 in this safety switch assembly 1 costs less than the switch 4, thus the desire to protect it, and the impact surface 9 is mounted such that it is easily and quickly replaceable.

As mentioned above, the switch 4 may be a non-contact proximity switch, preferably with a detection zone that extends beyond the impact surface 9. In this case, the impact surface 9 serves purely as a mechanical protection device, to protect the switch 4 from mechanical influences and possibly to protect it against other undesirable influences, such as sparks, splashes of liquid, precipitation, etc.

Although the impact surface 9 is shown in this embodiment positioned up against the switch 4, it is understood that the impact surface 9 may be mounted to be some distance removed from the switch 4. This is particularly desirable, when the switch 4 is a tactile switch which reacts to pressure. A separation between the impact surface 9 and the switch 4 reduces the likelihood of an accidental actuation of the switch 4, which might possibly be triggered by movements of the impact surface 9, for example, when driving over an uneven, bumpy surface.

If the switch 4 is a tactile switch, when the movable device 2 is backing up and the impact surface 9 comes into contact with an obstacle, for example, the operator's foot, the contact with the impact surface 9 exerts a pressure on the switch 4, which then trigger the switch operation. If the impact surface is mounted a short distance away from the switch 4, then the switch is triggered after the surface impact 9 has overcome that distance and presses against the switch 4. If, however, the switch 4 is a non-contact proximity switch, by the time the foot has come into contact with the impact surface 9 it has already entered the detection zone of the switch 4. In both cases, the switch 4 changes its switching state as a result of the actuating event, which actuation is evaluated by the controller, which in turns generates the pre-programmed response. The response may be to immediately switch off the electric drive of the running wheels 3, and possibly to reverse the previous direction of travel for a short distance, for example, 10 cm, so that the movable device 2 is automatically moved away from the obstacle.

In the embodiment of FIG. 1, the impact surface 9 is not inserted as far as possible into the groove 6, that is to say, it is not inserted all the way up to the base of the groove. The height at which the impact surface 9 is inserted depends on a desired ground clearance B between the lower end of the impact surface 9 and the floor or underlying surface. The ground clearance B is indicated in FIG. 1 by a double arrow. Initially, this ground clearance B may be preset as a coarse adjustment when the safety switch assembly 1 is assembled on the movable device 2. Once the bracket 5 is mounted on the movable device 2, then a fine adjustment of the ground clearance B is done by adjusting how far the impact surface 9 is inserted into the groove 6.

The bracket 5 is mounted and held on the movable device 2 by means of the bracket clamping cable 10. A bracket clamping channel 7 is provided in the bracket 5 above the groove 6, through which the bracket clamping cable 10 extends. In this embodiment, each of the two ends of the bracket clamping cable 10 is fastened in an end cap 12.

The surface of the bracket 5 that is in contact with the movable device 2 may be a non-slip surface, i.e., a surface that tends to create friction. If this is the case, the bracket clamping cable 10 provides sufficient clamping force to hold the bracket 5 on the device 2. Alternatively, the bracket 5 may be adhesively affixed to the movable device 2, for example by means of a self-adhesive surface on the bracket 5. The adhesive means may also be used in conjunction with the bracket clamping cable 10, to provide additional support to prevent slippage of the bracket 5 on the movable device 2. For example, depending on the strength of the adhesive, it may reinforce the holding force of the bracket clamping cable 10, to ensure that the bracket 5 does not slip. Or the adhesive means may be used to affix the bracket 5 to the movable device 2 and the bracket clamping cable 10 then provides a safety function, for example, to prevent an undesired detachment of the bracket 5 from the movable device 2, particularly in areas where the body of the movable device 2 is curved.

The impact surface clamping cable 11 extends through a second clamping channel 8 in the bracket 5. This cable 11 serves to clamp the impact surface 9 to the movable device 2 and thus, this second clamping channel 8 is also referred to as an impact surface channel 8. This impact surface channel 8 extends alongside of the groove 6, and to be precise, behind the groove 8, so that, when tightened, this impact surface cable 11 holds the impact surface 9 in place. In the embodiment shown, neither the groove 6 nor the impact surface 9 have complementary cross-sectional profiles that would act to form a positive form-fit of the two components. This is done intentionally, so that the depth to which the impact surface 9 is inserted into the groove 6 is continuously adjustable, thus enabling a fine adjustment of a desired ground clearance B as discussed above.

Figure 2:
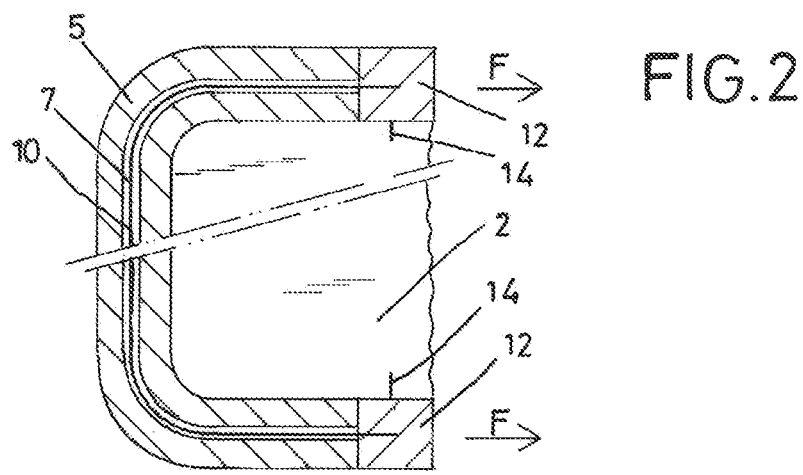
FIG. 2 is a horizontal cross-section through safety switch assembly of FIG. 1, illustrating the bracket clamp channel and a bracket clamping element that runs through the channel and that terminates in two end caps that are affixed to the movable device.

FIG. 2 shows a horizontal cross-section through the safety switch assembly 1 of FIG. 1 at the level of the bracket clamping cable 10. In this illustration, the body panel or housing on the back end of the movable device 2 curves around to the sides. The bracket 5 follows the contour of the housing and extends some distance on the sides. The end caps 12 at each end of the bracket 5 are fastened to the movable device 2 by means of a threaded fastener 14, which are shown only schematically. This configuration of the end caps 12 and the bracket 5 with the impact surface 9, together with the rear face of the movable device 2 provides an enclosure around the switch 4. In the normal everyday operation, the switch is not impacted from below, thus this enclosure provides good protection for the switch 4, thereby promoting the longest possible service life of the switch 4.

Figure 3:
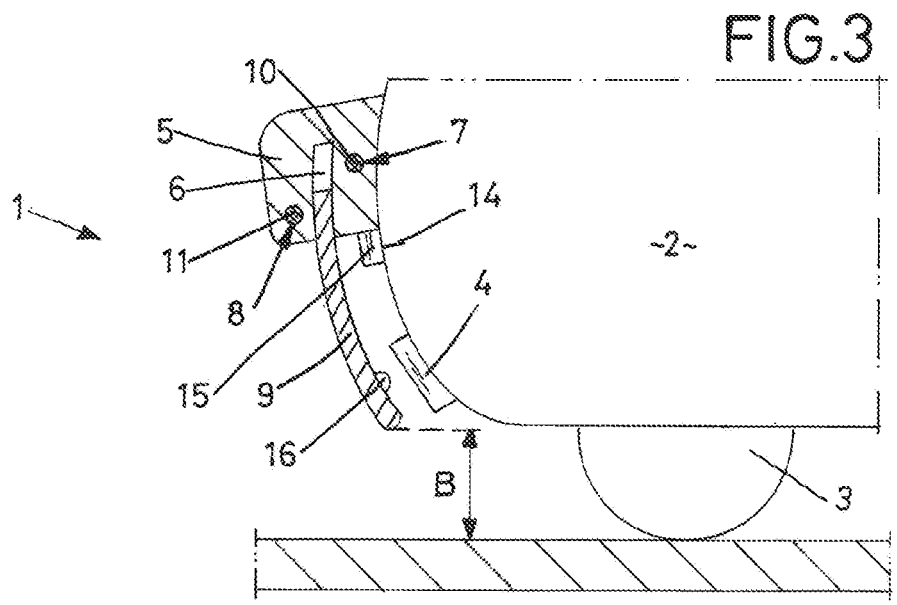
FIG. 3 is a vertical cross-section through a second embodiment of the safety switch assembly according to the invention, showing a curved contour of the movable device.

FIG. 3 shows a vertical cross-section similar to FIG. 1 through a second embodiment of a safety switch assembly 1 mounted on a movable device 2. This movable device 2, too, is an industrial truck with running wheels 3. The housing or body of the movable device 2, however, does not extend vertically on the rear side, as in the embodiment of FIG. 1, but is instead curved inward and downward, that is to say, curves inward towards the bottom. The housing may be curved three-dimensionally. The clamping force, which is applied to the bracket 5 by the bracket clamping cable 10, therefore also has a small downward force component, which may result in slippage of the bracket 5 on the movable device 2. A stop 15 is affixed to the movable device 2 below the bracket 5, to prevent undesired downward slippage. The stop may be affixed to the movable device 2 by means of a threaded fastener 14.

In the embodiment of FIG. 3, the stop 15 is constructed as an elongated strip which extends along the entire length of the bracket 5. Alternatively, two or more short strips may be used, each strip extending only along a section of the bracket 5. It is also possible that the screws 14 serve as stops 15. In this case, screws 14 are screwed from the outside into the vehicle body of the movable device 2 and the screw heads themselves serve as stops 15.

FIG. 3 also shows that the impact surface 9 has switch actuators, in this case, small protuberances referred to as switch nubs 16, on the surface facing the switch 4. In this embodiment, the switch 4 is designed as a switch strip or switch mat that has a large number of individual switching elements. The switch elements are in contact against adjacent elements and are connected to one another in an electrically conductive manner. Thus, when two such switching elements are pulled apart, the electrical connection is interrupted and this triggers a switching operation of the switch 4. This configuration ensures a highly sensitive response of the safety switch assembly 1, because, even in the case of a relatively low contact pressure of the impact surface 9 against the switch 4, the switch nub 16 exerts a force on a specific point, which transmits a relatively high surface pressure to the switch 4, thereby reliably separating two adjacent switch elements and triggering a switch response.

It may be desirable to provide the impact surface 9 as a smooth component, i.e., without the switch actuators 16 formed on its surface. As an alternative to the switch actuators 16 in the form of nubs, other types of elements may be used to ensure a reliable triggering of the switch 4. For example, ribs, rods or similar elements may be suspended from the bracket 5 and hang down between the impact surface 9 and the switch 4, which then provide the desired punctiform or linear force action on the switch 4.

There are many conceivable possibilities of laying out and tensioning the bracket clamping cable 10 and the impact surface clamping cable 11 on the safety switch assembly 1 according to the invention. In the safety switch assembly 1 shown in FIGS. 1 and 3, the same tensioning means are applied to the bracket clamping cable 10 and the impact surface clamping cable 11. FIGS. 4 through 9 are schematic illustrations of various suitable layouts of a clamping element and a tensioning device. These six illustrations are non-specific to a particular component that is to be clamped to the movable device 2, in the sense that they illustrate clamping means that may be used to clamp the bracket 5 and/or the impact surface 9. Thus, it is understood that a clamping cable 17 referenced in these illustrations may be used as the first clamping element or bracket clamping cable 10, as well as the second clamping element or impact surface clamping cable 11.

Figure 4:
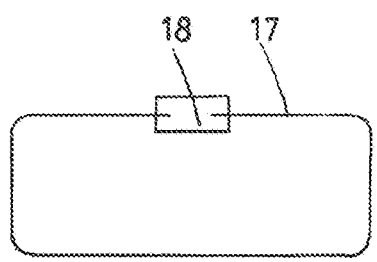
FIG. 4 is a plane view of a first embodiment of the clamping element showing a closed loop layout of the clamping cable and tensioner.
Figure 5:
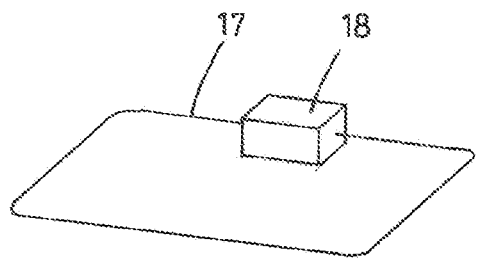
FIG. 5 is a perspective view of the clamping element of FIG. 4, illustrating a horizontal layout of the clamping element and orientation of the tensioner.

FIGS. 4 and 5 illustrate a first layout of a clamping element, a closed-loop layout. The clamping cable 17 extends around the rear side of a movable device 2 (not shown) and the two ends of the clamping cable 17 are connected to a common tensioning device 18, such as a turnbuckle or shroud tensioner. The tensioning device 18 allows the tension on the clamping cable 17 to be selectively tightened or loosened. With respect to the movable device 2 illustrated in FIGS. 1 and 3, the tensioning device 18 is mounted inside the housing or body panel of the movable device 2. Bores are provided in this housing or body panel, so that the cable 17 extending from the end caps 12 or directly from the bracket 5 may be guided through the bores to the tensioning device 18. FIG. 5 is a perspective view of the layout, showing that the clamping cable 17 and the tensioning device 18 extend on the same horizontal plane.

Figure 6:
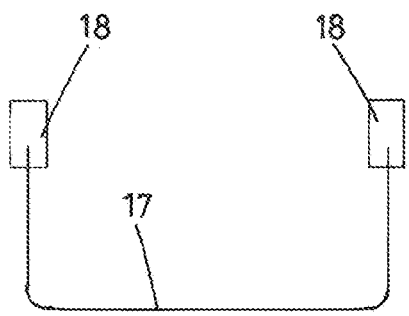
FIG. 6 is a plane view of a second embodiment of the clamping element, showing a C-shaped layout of the clamping cable with each of two ends attached to a tensioner.
Figure 7:
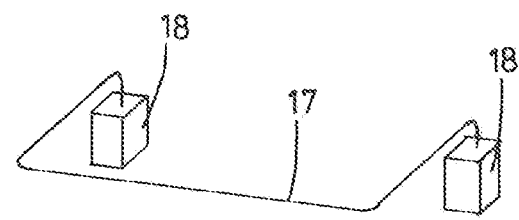
FIG. 7 is a perspective view of the clamping element of FIG. 5.

FIGS. 6 and 7 illustrate an open, approximately C-shaped layout of the clamping cable 17. In this configuration, two tensioning devices 18 are provided on the movable device 2, one on each side, and each end of the clamping cable 17 is attached to a respective one of the tensioning devices 18. The orientation of the tensioning devices 18 is indicated purely schematically and is not limited to the particular orientation shown. In this illustration, the direction of action of the tensioning devices 18 is vertical, but it is understood that tensioning devices may be oriented to provide a horizontal direction of action. With reference to the embodiments shown in FIGS. 1 and 3, it is also possible that the two tensioning devices 18 are each firmly mounted in a respective end cap 12.

FIG. 7 is a perspective view of the layout illustrated in FIG. 6. The ends of the clamping cable 17 are deflected downward and the tensioning devices 18 are arranged such that they have a vertical upward direction of action. This orientation allows the tensioning devices 18 to be accommodated in comparatively narrow, upright end caps 12 to hold the impact surface 9 within the bracket 5. If, however, the bracket 5 itself is to be held by the clamping cable 17, then the tensioning devices 18 for the impact surface clamping element 11 are mounted on the movable device 2, for example, to its housing.

Figure 8:
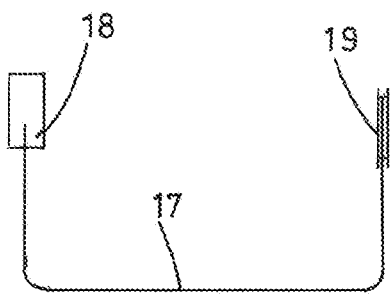
FIG. 8 is a plane view of a third embodiment of the clamping element, showing a continuous loop layout of the clamping cable that includes a tensioner and a deflector roller.
Figure 9:
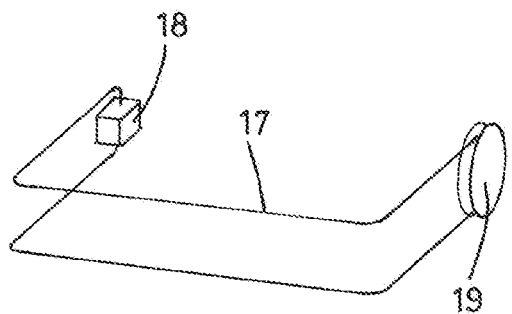
FIG. 9 is a perspective view of the clamping element of FIG. 8, showing a single clamping cable that runs along two horizontal planes.

FIGS. 8 and 9 illustrate another C-shaped layout of the clamping cable 17. In this layout, however, the clamping cable 17 is in a closed-loop, with a tensioning device 18 on one side and a deflector roller 19 on the opposite side. The two ends of the clamping cable 17 are connected to the single tensioning device 18 and guided around the deflector roller 19. The perspective view shown in FIG. 9 illustrates that the clamping cable 17 does not run along a single plane, but, because of the deflector roller 19, runs along two different planes. This layout is particularly suitable for a reliable, large-area mounting of the bracket 5 or of the impact surface 9, depending on whether the clamping cable 17 serves as a bracket clamping element 10 or as the impact surface clamping element 11. But it also allows the same clamping cable 17 to clamp both the bracket 5 and the impact surface 9. Because the cable 17 runs along two planes, the same clamping cable 17 may be guided through the first clamping channel, i.e., bracket channel 7, as well as through the second clamping, i.e., impact surface channel 8, so that different sections of the same clamping cable 17 serve, on the one hand, as the bracket clamping element 10 and, on the other hand, as the impact surface clamping element 11.

FIGS. 4 to 9 each show a clamping cable 17 that serves as the clamping element 10 and/or 11. Alternatively, the bracket 5 itself may form the clamping element or at least one section of the clamping element. For example, tensioning devices 18 may be connected to the two ends of the bracket 5. Or clamping cables 17 may be attached to the two ends of the bracket 5, which then, corresponding to FIG. 4 or 8, are connected to a common tensioning device 18, or which, according to FIG. 6, are connected to a separate tensioning device 18 for each cable.

Figure 10:
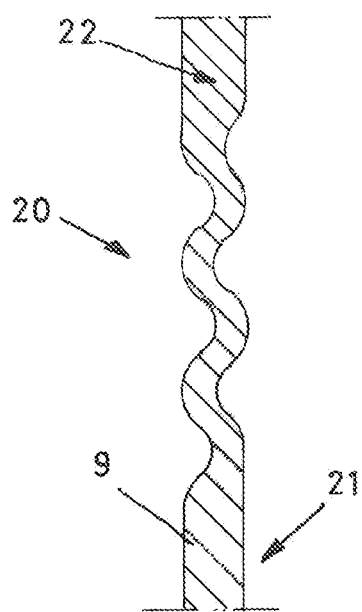
FIG. 10 is a partial vertical cross-sectional view of one embodiment of the impact surface, illustrating a deformation section that has a wavy profile.
Figure 11:
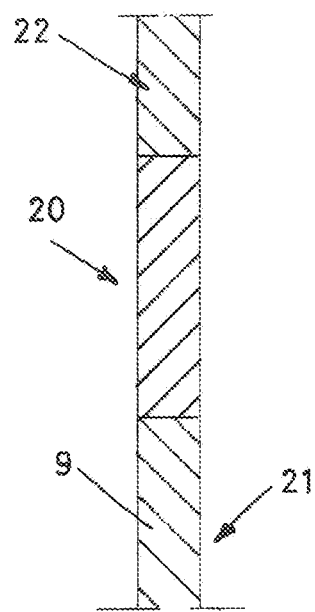
FIG. 11 is a partial vertical cross-sectional view of a second embodiment of the impact surface, illustrating a deformation section that is made of a different material.
Figure 12:
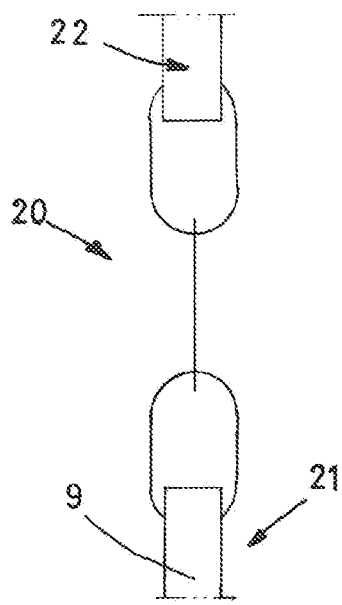
FIG. 12 is a partial vertical view of a third embodiment of the impact surface, showing a deformation section constructed of chain links.

FIGS. 10 to 12 are partial cross-sectional views, showing that illustrate various embodiments of the impact surface 9. As previously mentioned, the impact surface 9 has sufficient rigidity to actuate the switch 4, yet sufficient flexibility to conform to the contour of the movable device 2. One way to achieve this dual functionality is to provide three sections on the impact surface 9: a top section that is a bracket section 22, a middle section that is a deformation section 20, and a bottom section that is an actuation section 21. The bracket section 22 is sufficiently hard or rigid to ensure a firm hold of the impact surface 9 in the groove 6 of the bracket 5, and the actuation section 21 is made of the semi-hard material to actuate the switch 4. The deformation section 20 is preferably provided on the impact surface 9 just below the lower edge of the bracket 5 and has a reduced rigidity, such that it acts similarly to a joint or a hinge that allows the actuation section 21 to swing forward without the bracket section 22 having to move. The FIGS. 10-12 show the vertical cross-section of the deformation section 20 and just partial cross-sectional views of the bracket and actuation sections 22 and 21.

In the embodiment of FIG. 10 illustrates a geometric structural strength reduction in order to form the deformation section 20. The impact surface 9 is formed as a continuous sheet or plate from the same material with a uniform thickness. The rigidity of the material is reduced in the deformation section 20 by creating an undulating, i.e., a wavy contour in this section.

FIG. 11 shows an impact surface 9, in which the actuating section 21 and the bracket section 22 on the one hand, and the deformation section 20 on the other hand are made of different materials. The material of the deformation section 20 has greater flexibility, i.e. has a lower bending stiffness, compared to the material of the other two sections 21 and 22. The impact surface 9 of FIG. 11 may be produced, for example, by coextruding the two different materials, so as to ensure a mechanically loadable, permanent bond of the two materials.

FIG. 12 shows an impact surface 9, in which the deformation section 20 is constructed as a mechanical joint which connects to the actuating section 21 and the bracket section 22. Purely by way of example, the deformation section 20 illustrated in FIG. 12 is a very short chain of three chain links. It is understood that the chain is not limited to one with just three links. A plurality of such chains may be provided along the width of the impact surface 9, spaced apart from one another. This construction of the deformation section 20 allows the actuation section 21 to move into the actuation position, problem-free and stress-free, even as the impact surface 9 is firmly held in the groove 6 and conforms to the curve of the bracket 5 around to the sides, as shown in FIG. 2.

It is understood that the embodiments described herein are merely illustrative of the present invention. Variations in the construction of the safety switch assembly may be contemplated by one skilled in the art without limiting the intended scope of the invention herein disclosed and as defined by the following claims.

The invention claimed is:

1. A safety switch assembly that is adapted for use on a movable device, the safety switch assembly comprising:
   a switch;
   a bracket;
   an impact surface that is held in position in the bracket; and
   a clamping element that is tension resistant but sufficiently flexible so as to conform to a contour of the movable device, the clamping element configured to secure the impact surface in position, the clamping element adapted to mount the bracket and/or the impact surface against the movable device, the tension resistant clamping element pulling the bracket and/or impact surface against the contour of the movable device;
   wherein the impact surface is a replaceable component; and
   wherein the impact surface provides an enclosure that shields the switch against the outside.

2. The safety switch assembly of claim 1,
   wherein the impact surface is made of a semi-rigid construction, such that the impact surface is flexibly deformable to a curve or a wave shape.

3. The safety switch assembly of claim 1,
   wherein the impact surface is a two-dimensional plate made of a semi-hard material.

4. The safety switch assembly of claim 1,
   wherein the clamping element has two ends, each of which is fastened to the movable device.

5. The safety switch assembly of claim 1,
   wherein the clamping element has two ends that are connected to one another such that the clamping element is laid out as a closed loop.

6. The safety switch assembly of claim 1, further comprising:
   a first clamping channel that is provided in the bracket;
   wherein the impact surface is arranged in the bracket between the first clamping channel and the movable device; and
   wherein the clamping element runs through the first clamping channel of the bracket and clamps the impact surface in position in the bracket.

7. The safety switch assembly of claim 1, further comprising:
   a second clamping channel and a bracket clamping element that runs through the second clamping channel;
   wherein the bracket clamping element clamps the bracket against the movable device; and
   wherein the impact surface is held in the bracket outside of the force action field of the bracket clamping element.

8. The safety switch assembly of claim 1,
   wherein the bracket itself forms a clamping element; and
   wherein the bracket has two ends that are connected to a tensioning device.

9. The safety switch assembly of claim 1,
   wherein the bracket has a groove with an opening at a lower end of the groove and a groove base at an upper end of the groove; and
   wherein the impact surface is inserted into the groove.

10. The safety switch assembly of claim 9,
    wherein the clamping element extends at a distance below the base of the groove, such that the impact surface can be fixed in place at different height settings within the groove.

11. The safety switch assembly of claim 1, further comprising:
    a stop that is affixable to the movable device;
    wherein the bracket makes contact against the stop when stop and bracket are mounted on the movable device.

12. The safety switch assembly of claim 11,
    wherein a screw with a screw head is fastened onto the movable device and the screw head serves as the stop of the movable device.

13. The safety switch assembly of claim 1,
    wherein the impact surface has a three-section construction that includes a bracket section and an actuation section, with a deformation section therebetween;
    wherein the deformation section allows the actuation section to move between a resting position and an actuating position that actuates the switch.

14. The safety switch assembly of claim 13,
    wherein the deformation section is formed by a geometric structural weakening of the impact surface.

15. The safety switch assembly of claim 13,
    wherein the deformation section is formed by a strip of material that has a lower resistance to bending than material used for the actuation section.

16. The safety switch assembly of claim 13,
    wherein the deformation section has a mechanical joint.

17. The safety switch assembly of claim 1,
    wherein the clamping element is a clamping cable.

18. The safety switch assembly of claim 1,
    wherein the clamping element is a tension strap.

19. The safety switch assembly of claim 18,
    the tension strap is a metal strip.

20. The safety switch assembly claim 1,
    wherein the clamping element is made of a fiber-reinforced composite material.

21. The safety switch assembly of claim 1,
    wherein the impact surface serves as an actuator of the switch and is movable between a first rest position and a second actuation position that triggers a switching operation of the switch,
    wherein the impact surface is constructed as a rigid impact surface, such that, when pressure is exerted on a point on the impact surface that is offset with respect to the switch, adjacent areas of the impact surface are also movable into the actuating position, so as to trigger a switching operation despite the offset.

22. The safety switch assembly of claim 1,
    wherein the switch is constructed as a switch strip or switch mat.

* * * * *